United States Patent
Fuss

(10) Patent No.: US 6,432,312 B1
(45) Date of Patent: Aug. 13, 2002

(54) CLOSED SYSTEM FOR REARING AQUATIC LIFE

(76) Inventor: Joseph T. Fuss, R.D. 2 Box 102 C, Middlebury Center, PA (US) 16935

( * ) Notice: Subject to any disclaimer, the term of this patent is extended or adjusted under 35 U.S.C. 154(b) by 0 days.

(21) Appl. No.: 09/266,400

(22) Filed: Mar. 13, 1999

Related U.S. Application Data

(60) Provisional application No. 60/079,532, filed on Mar. 27, 1998.

(51) Int. Cl.[7] .............................................. B01D 15/00
(52) U.S. Cl. ...................... 210/668; 119/211; 119/261; 119/268; 210/669; 210/670; 210/681; 210/760; 210/806; 210/169; 210/195.1; 210/202; 210/265; 210/266; 210/903
(58) Field of Search ................................ 119/211, 259, 119/261, 268; 210/668, 669, 670, 681, 760, 806, 169, 202, 218, 265, 266, 903, 664, 805, 195.1, 205

(56) References Cited

U.S. PATENT DOCUMENTS

| | | | |
|---|---|---|---|
| 3,661,262 A | 5/1972 | Sanders | 210/169 |
| 3,723,308 A * | 3/1973 | Breck | 210/681 |
| 4,052,960 A | 10/1977 | Birkbeck et al. | 119/3 |
| 4,522,727 A * | 6/1985 | Weber | 210/681 |
| 5,006,230 A | 4/1991 | Votava, III et al. | 210/94 |
| 5,076,209 A | 12/1991 | Kobayashi et al. | 119/3 |
| 5,114,576 A * | 5/1992 | Ditzler et al. | 210/202 |
| 5,145,585 A * | 9/1992 | Coke | 210/760 |
| 5,244,585 A * | 9/1993 | Sugimoto | 210/791 |
| 5,853,578 A * | 12/1998 | Flyaks et al. | 210/169 |

* cited by examiner

Primary Examiner—Ivars Cintins
(74) Attorney, Agent, or Firm—John J. Elnitski, Jr.

(57) ABSTRACT

The present invention provides improvements for indoor closed systems used to raise aquatic life, along with methods to overcome the current problems associated with such indoor closed systems. The present invention provides an aquatic life rearing system which reuses water in the rearing process and does not pollute lakes or streams due to waste water discharge. The improvements include a method of preventing performance degradation of equipment which removes ammonia from the rearing water.

15 Claims, 1 Drawing Sheet

CLOSED SYSTEM FOR REARING AQUATIC LIFE

This application claims the benefit of U.S. Provisional Application No.: 60/079,532 filed Mar. 27, 1998.

BACKGROUND

The favorable financial aspects of rearing aquatic life such as fish in a closed system on a commercial scale have attracted investors for many years. The prospective market is enhanced by the fact that oceans and streams are suffering from over-fishing and pollution. The fish industry cannot supply the world demand and the risk of receiving polluted fish is on the rise. Fish raised in closed systems can provide a guaranteed delivery of fish in top condition, at any time of the year, thereby commanding a premium price. Other advantages of closed systems are that they eliminate the problems associated with the discharge of current fish hatcheries. Closed systems eliminate rain/runoff events affecting a hatchery's water supply, allow absolute control over rearing cycles via temperature control, and allow the ability to treat the fish for disease without the problem of releasing agents into the watershed. Therefore, on paper, raising fish in a closed system shows the potential of a tremendous return on an investment. However, current technology has not produced an economical and fully dependable closed system. Researchers have attempted to create fish culture closed systems for the last 25 years, but none of the systems have been particularly successful commercially and many have simply failed.

The disadvantage of a closed system which makes them unpopular in the fish industry is that closed systems are technically complex. The complexity of the closed system increases the chance of lost fish production due to mechanical failure. Closed system technology can be divided into five major areas: temperature control, maintenance of dissolved oxygen levels, disease control, sediment removal and ammonia removal. For temperature control, current closed systems usually rely on boilers and heat exchangers. Maintaining high dissolved oxygen levels equates to high production levels of fish. Current systems maintain oxygen levels through various aerators and air-injection devices. These devices have proven to be inefficient and subject to failure. Disease control is a must for closed systems, as the intensive conditions provide the potential for disease problems. Normally, the disease problems in flow through systems are treated with various FDA approved antibiotic drugs.

The two major areas which most discourage the use of closed systems are sediment removal and ammonia removal. For sediment removal, many older systems relied on sediment trapping filters that are expensive both to purchase and to operate. Ammonia removal has been the most technologically limiting area for closed-system development. Previous systems have employed various mutations of biofilters. As the name implies, biofilters rely on a biological process of living bacteria converting toxic forms of ammonia to non-toxic forms. The biofilters require several weeks to become established and consume more oxygen than the fish being reared. The biofilters must be removed or isolated from the system should disease treatment become necessary, as the antibiotics used in the disease treatment would simultaneously destroy the biofilter. In addition, bacteria within the filters reduce the pH of the water and increase carbon dioxide levels, each of which must be countered with additives. Far worse, however, is the unpredictable nature of the biofilters to suddenly "die-off" and cease to function. The aqua-culturist has no choice but to watch the fish in the system die of ammonia poisoning. Another form of ammonia removal is the use of zeolite, a naturally occurring mineral. Zeolite has the natural ability to absorb ammonia. Tanks of the mineral can be used effectively to absorb ammonia from fish water. Unfortunately, the zeolite eventually becomes covered and fouled with biological growth, thereby reverting the filters of a closed system to a biological process.

It is an object of the present invention to provide an improved indoor aquatic life rearing system which does not pollute lakes or streams with waste water.

It is an object of the present invention to provide a method of preventing performance degradation of equipment which removes ammonia from water of an aquatic life rearing system.

SUMMARY

The present invention provides an aquatic life rearing system which includes at least one rearing tank holding water for rearing aquatic life. Each rearing tank including a first drain. A solid removal means is provided for removing solids from a first drain flow of water that emanates from the first drain. An ammonia removal filter is provided for removing ammonia from said first drain flow. The system includes an ozone input into the first drain flow. The system can further include a gas transfer means for providing oxygen to the first drain flow. The system can also include two drains. Whereby the first drain is a bottom drain at the bottom of each rearing tank and the second drain is a mid-level drain at about the mid-level of each rearing tank. The present invention also provides a method of inputting ozone into the first flow before the first flow enters an ammonia removal filter. The ozone destroys organic matter in the ammonia removal filter and prevents fouling of the ammonia removal filter.

DETAILED DESCRIPTION

Figure 1:
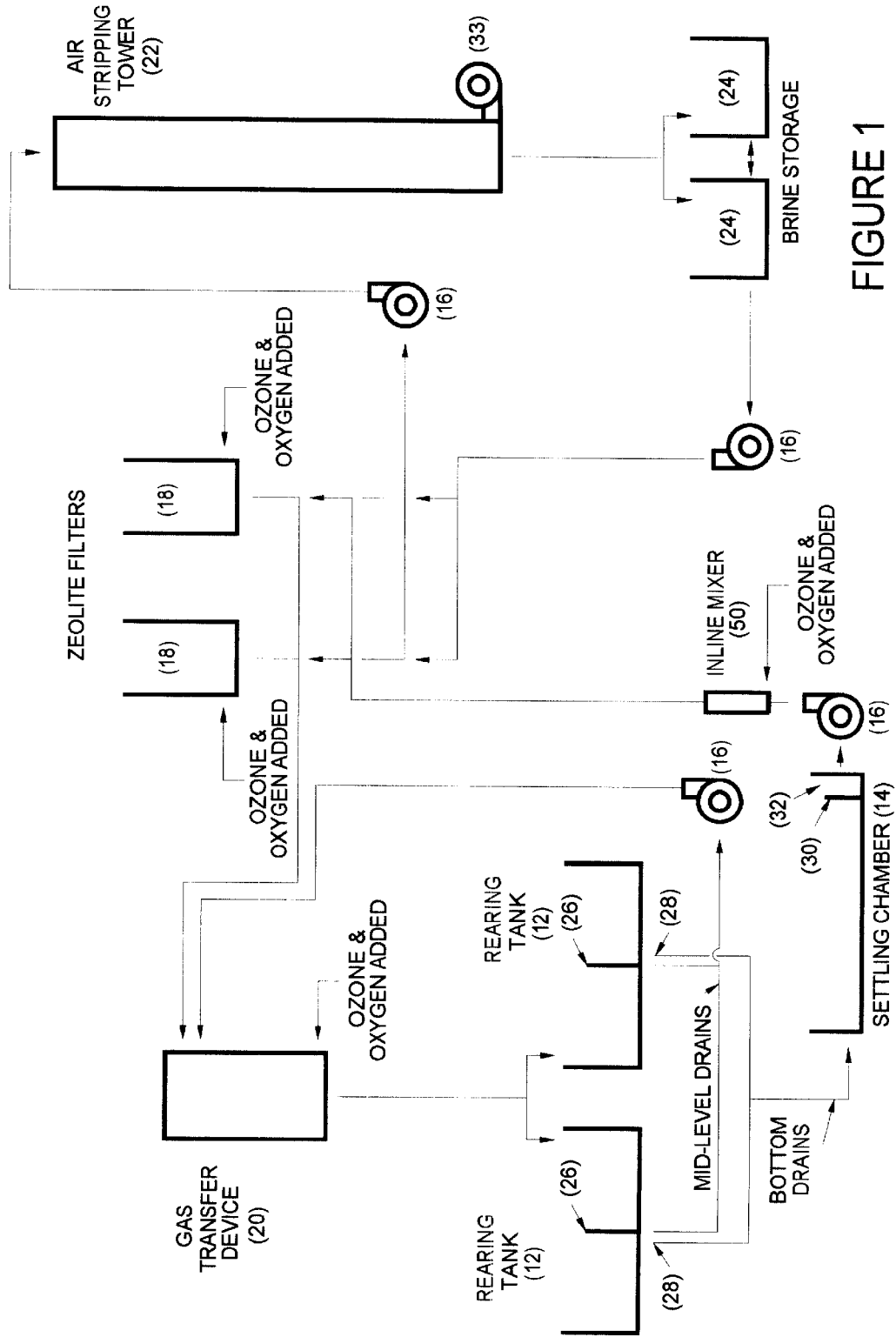
FIG. 1 is a schematic of an indoor aquatic life rearing system according to the present invention.

The present invention provides improvements for indoor closed systems used to raise aquatic life, along with methods to overcome the current problems associated with such indoor closed systems. The following description of the present invention will be based on the raising of fish in rearing tanks, but its application relates to raising any type of aquatic life. The improvements of the closed system and their method of use can also be applied to outdoor fish rearing systems. Each of the major areas discussed above for closed systems will be addressed by improvements and the methods of employing those improvements.

Temperature control is addressed by the present invention with energy-efficient structures and advances in insulating materials. The improved closed system maintains water temperature by employing ambient air of the room which houses the rearing tanks. Constructing a well insulated room allows for the economical maintenance of water temperatures at the ambient air temperature. Therefore, the water temperature of the closed system can be maintained by either an air conditioner, a heat pump or a heater utilized to maintain the temperature of the room. Dissolved oxygen levels are maintained by the injection of pure oxygen and ozone associated with the closed system improvements provided by the present invention. The closed system also includes an emergency oxygen system that operates automatically should water flow to the rearing tanks cease. The emergency oxygen system does not require power to operate and includes both on-site generated and bottled oxygen connected to fine pore diffusers located in the bottom of each rearing tank.

The problems associated with sediment removal are addressed by a two level or split drainage system in each rearing tank. Each rearing tank includes a drain to remove the majority of the water from the mid to upper level of the tank. Each tank also includes another drain to remove the balance of the water from the bottom of the tank. The water drained from the bottom of the tank contains the sediment associated with rearing fish. Since the flow is smaller from the bottom drain, a settling chamber to remove the sediment is utilized. If required, a sediment trapping filter can be used in place of the settling chamber. One example of a sediment trapping filter is a two stage filtering system. The two stage filtering system employs two types of filters. The first filter is a sediment filter to remove particles greater than 25 microns from the water. The second filter is a pressure sand filter to remove any remaining suspended solids from the water. The two stage filter system can remove nearly 100% of the solids, but from an operational point of view, the filter system is an expensive process. Both filters of the system are expensive to operate as they each require high pressure water pumps for operation. Therefore, the alternative method of using a split drain and simple settling chamber to remove sediment allows for the elimination of the filters and pumps. Elimination of the filters and pumps greatly reduces the cost of the system and simplifies total system operation.

The problems associated with ammonia removal are addressed by using a method to prevent fouling of an ammonia removal filter that employs zeolite. The application of natural zeolite or synthetic zeolite as a filter to remove the ammonia provides a predictable means for the absorption and removal of a known quantity of ammonia. This approach provides a very predictable period of operation before the zeolite is saturated with ammonia and re-generation of the zeolite is required. Regeneration is the removal of ammonia from the zeolite, when the zeolite can no longer absorb any more ammonia. Generally, the zeolite filter is sized to operate for a two or three day period under maximum load of the rearing tanks before the zeolite becomes saturated. Maximum load of the rearing tanks, however, only occurs for a short period of time towards the end of a rearing cycle for the fish. During the early stages of rearing, the fish produce less waste than at the later stages of rearing. Therefore, a zeolite filter can be used for several weeks before it must be regenerated. One size of zeolite filter found to be successful was one that allows a flow of approximately four gallons per minute per square foot of cross-sectional surface area of zeolite.

Even with proper sediment removal, biological growth can occur within the zeolite and degrade the performance of the closed system. To prevent the biological growth on the zeolite, ozone gas and pure oxygen are injected into the flow of the rearing water before it reaches the zeolite filter. The ozone gas destroys any biological action that would normally occur and foul the zeolite. The ozone provides the added benefit of directly oxidizing a portion of the ammonia, thereby aiding the process of ammonia removal. Aquaculturists generally do not use ozone because the ozone will kill the fish. The present invention solves this problem by adjusting the amount of ozone, so that nearly 100% of the ozone dissipates as it oxidizes the biological matter during ammonia removal. The amount of ozone to be added depends on the size of the system, so that the ozone dissipates properly. The zeolite filters are sized to provide sufficient contact time for the ammonia to be removed and the ozone to dissipate before the water returns to the rearing tanks. Should any excess ozone remain, it is removed from the water as the water is aerated and by the use of ozone destruction units. Other advantages of using zeolite and ozone as compared to use of a biofilter are that there is no consumption of oxygen by the filter because the ozone degrades into pure oxygen; the zeolite does not effect the pH of the water; and the zeolite does not produce carbon dioxide. Finally, the zeolite is not subject to the sudden failures associated with biofilters.

A problem presented with any closed system is how to backup an ammonia removal system without affecting the fish. Backup ammonia filters are not possible in systems using biofilters, as biofilters take several weeks to become established. This problem is solved in the present invention by providing a second zeolite filter to treat the rearing tank water. The second filter serves as a backup during re-generation of the first zeolite filter or should the first zeolite filter fail for any unforeseen reason. The second zeolite filter can be put into service immediately, without having to wait several weeks to become established, as is the case with biofilters. When the first zeolite filter nears saturation of ammonia, the ammonia levels in the rearing water will slowly begin to rise. There is sufficient data available to predict when saturation will occur and allows for the sizing of the zeolite filters accordingly. When the first zeolite filter becomes saturated with ammonia, the rearing water flow is switched to the second zeolite filter. The saturated zeolite filter is then re-generated. Re-generation of the zeolite filter involves the stripping of the ammonia from the zeolite.

One method of re-generation is by flushing the zeolite with a 2% brine solution. The zeolite filter can usually be stripped of nearly 100% of the ammonia in less than 12 hours. The first zeolite filter is then rinsed with freshwater and put on standby, in effect becoming the second zeolite filter. The brine solution laden with ammonia can be recycled by stripping the ammonia from the brine. One method of stripping the ammonia from the brine is by passing the brine through an air stripping tower. The air stripping tower is a column equipped with a blower at the bottom of the column. The air stripping tower is vented to the outside of the building with a venting system. The venting system allows air and ammonia to vent to the outside. The pH of the ammonia laden brine is increased to approximately 11 and is then dispensed into the top of the air stripping tower using a distributor. The distributor is usually at least one nozzle which allows misting of the brine into the column, but can be as simple as a pipe positioned above a plate that serves to distribute the brine over the cross-sectional area of the tower. The blower blows air upward and the air removes the ammonia from the brine. The upward air flow carries the ammonia out the venting system. The air stripping tower can be filled with packing media as in a packed column. A less efficient version of the stripping tower includes a blower at the bottom and no packing media between the input of the brine and the blower. In this case, some type of packed media should be used and supported above the input of the brine into the column. The packed media prevents the escape of the brine from the column, as air is blown up through the dispensed brine.

After the brine has passed through the tower, it is ready for re-use in the re-generation of the zeolite filter. Fifty percent (50%) or more of the ammonia is usually removed from the brine in a single pass using the air stripping tower. Though ammonia is not completely removed from the brine, the recycled brine still absorbs ammonia from the zeolite. It is suggested to use two brine storage tanks which have the capability to switch input and output of both tanks with the zeolite filter and air stripping tower. The two tanks allow separation of the recycled brine from the brine which has been removed from the zeolite filter. That is, at the start of the zeolite stripping process, one tank is full with brine ready to remove ammonia, while the other tank is empty. As stripping proceeds, the brine from the zeolite filter is passed through the air stripping tower and then fills the empty tank. When the empty tank is filled, the roles of the tanks are reversed. The now full tank supplies brine to the zeolite filter, while the now empty tank receives recycled brine from the air stripping tower. The two tanks provide separation of the brine. Separation of the brine tanks is desired, as there will most likely always be a difference in ammonia levels between the brine fed into the zeolite filter and the brine exiting the air stripping tower. The brine is maintained at a pH of about 11. To maintain the brine at the proper pH level, the brine requires adjustment of the pH throughout the stripping process. The brine should contain about 2% salt, by weight. The amount of brine needed to re-generate the zeolite in the filter is at least two bed volumes. A bed volume is the amount of liquid the zeolite filter can hold.

FIG. 1 schematically shows an example of a closed system which employs the improvements discussed above. The components of the closed system include at least one rearing tank 12 (two tanks are shown); a settling chamber 14, four pumps 16, two zeolite filter columns 18, an enclosed packed column or contact chamber 20, an air stripping tower 22 and two brine storage tanks 24. All components are connected by piping or tubing (not shown). Packed columns and contact chambers are known in the art as devices for the removal and addition of gases to liquids such as water. The packed column and the contact chamber will be referred to collectively as a gas transfer device 20. One version of a gas transfer device 20 found to be effective is an empty column or chamber that is nothing more than a closed hollow pipe or box. A perforated plate is positioned approximately 1-foot below the top of the chamber and the input of the water flows. The perforated plate serves to break the water up into many small columns or droplets. The chamber should be fitted with access to inspect and clean the plate. The chamber should be vented to the outdoors at the top of the chamber and fitted with an ozone destruction unit (not shown). An oxygen generator and ozone generator (not shown) are also included to provided oxygen and ozone where needed in the system. The percentage of ozone inputted into the system depends on the size of the system and should be determine before operation of the system with the fish.

Each rearing tank 12 includes a split drain system of a mid-level drain 26 and a bottom drain 28. The mid-level drain 26 is positioned at or above the mid-point of the tank 12. The mid-level drain 26 pulls rearing water from above mid-point of the tank 12. The bottom drain 28 pulls rearing water from the bottom of the rearing tank 12. Optimally, the rearing tanks 12 are round with a sloping bottom. The solids to be removed are forced to the bottom center of the rearing tanks 12 due to the sloping bottom and internal hydraulics of the tank 12. The solids are removed as part of the flow through the bottom drain 28. An additional benefit of using the round tanks is that they seldom, if ever, require manual cleaning, thus reducing the operational costs. The water in the rearing tanks 12 exits as two unequal and separate flows, when using the split drain system. One advantage of using the split drain approach is that the solids are concentrated in a much smaller flow. The smaller flow of solids allows the use of settling chambers, which is a feasible and economic alternative to sediment trapping filters.

The flow from the mid-level drain 26 contains very few, if any, solids. The mid-level drain flow is treated by the gas transfer device 20 for oxygen depletion and removal of carbon dioxide. The mid-level drain flow is also the larger of the two drainage flows and is pumped by of one of the pumps 16 to the gas transfer device 20. Even though the mid-level drain flow is the primary oxygen transfer means for providing oxygen to the rearing tanks 12, the bottom level flow also provides aeration. As such, operation of the mid-level flow is not necessary until the amount of fish being reared in the tanks 12 requires the additional oxygen. This feature serves to reduce operational costs when the rearing load is light. The gas transfer device 20 is supplied with ozone and oxygen. The ozone and oxygen move upward in the device 20 and through the flow which is moving downward in the device 20. The ozone prevents the gas transfer device 20 from fouling with bacterial matter. Any excess ozone is vented to the ozone destruction unit. The water flow through the gas transfer device 20 absorbs the oxygen as it returns to the rearing tanks 12.

The oxygen concentration can reach as high as 125% saturation by the time the water leaves the gas transfer device 20 and returns to the rearing tanks 12.

The flow from the bottom drain 28 is treated for solids and ammonia removal. The bottom drain flow containing the solids is shown passing through the settling chamber 14. The settling chamber 14 includes a solid baffle 30 so that the rearing water flows over the baffle 30, while the solids settle to the bottom of the settling chamber 14. The baffle 30 creates a receiving area 32 in the settling chamber 14 for the rearing water which no longer contains the solids. There are other known examples of settling chamber design which can be used. If space is not available for the settling chamber, solids can be removed using sediment trapping filters as mentioned above.

After the flow moves through the settling chamber 14, the water is pumped from the receiving area 32 with one of the pumps 16 to one of the zeolite filters 18, for ammonia removal. As the water travels from the settling chamber 14 to the zeolite filter 18, the flow is injected with the ozone and oxygen. An optional inline motionless mixer (50) can be used to enhance the mixing of the ozone and oxygen with the water. The inline mixer is positioned in the flow after the injection point of the ozone and oxygen and before the zeolite filters 18. The inline mixer is known in the art for creating turbulent flow in a pipe or tube. Creating turbulence in the flow enhances the ability of the ozone and oxygen to mix with the flow. After injection of ozone and oxygen to the bottom drain flow, the flow is inputted into the bottom of one of the zeolite filters 18 for ammonia removal. Additionally, to assure that biofouling of the zeolite does not occur, additional ozone and oxygen can be injected into the zeolite filter 18 at the input of the rearing water into the filter 18. The flow moves upward through the filter 18. The zeolite filter 18 is usually a tank filled with zeolite. The tank includes an outlet for the flow, which is positioned below the top of the tank to allow for head space in the tank. The head space provides for the collection of gases such as excess ozone. The zeolite filter tanks should be fitted with gas-tight lids, but have access for acid addition or inspection. It may also be necessary to occasionally remove or replace the zeolite via the access. The tanks should be vented to the ozone destruction unit (not shown) for removal of excess ozone in the filter 18. One way of inputting the water into the bottom of the tank is the use of a distributor. An example of a distributor is a series of pipes positioned in the bottom of the tank. The pipes include holes and are connected to an input pipe carrying the flow of rearing water into the tank. The water flows through the pipes, out of the holes and into the tank of zeolite. The distributor allows an even distribution of the water through the zeolite. The same type of distributor can be used to input the ozone and oxygen directly into the zeolite filter 18. Finally, the water exits the zeolite filter 18 at the tank outlet and is returned to the rearing tanks 12 via the gas transfer device 20. The bottom drain flow receives oxygen as it returns to the rearing tanks 12 when the ozone converts to oxygen during the ammonia removal process and when the flow passes through the gas transfer device 20.

Once the zeolite of the filter 18 is saturated with ammonia, it must be re-generated. Therefore, each zeolite filter tank must have the option of either being connected to the flow from the rearing water tanks, to the brine system for re-generation, or to fresh water and a drain for rinsing. The zeolite column 18 saturated with ammonia is taken off-line and the brine solution is circulated by one of the pumps 16 through the zeolite column 18, as discussed above. While the zeolite column 18 is being re-generated, the second zeolite column 18 is placed online to remove ammonia from the rearing water, thus preventing interruptions to the rearing cycle. The ammonia-laden brine exiting the zeolite filter 18 can be immediately sent through the air stripping tower 22 or to an empty storage tank 24. As discussed above, the air from the blower 33 strips the ammonia from the brine and the ammonia is vented outside the building by the air stripping tower 22. The brine is then routed back to one of the brine storage tanks 24 and onto the off-line zeolite column 18 to remove more ammonia. This re-generation process continues until the zeolite in the filter 18 is ready for use once again. After re-generation, the zeolite is rinsed and requires the pH to be adjusted to match that of the rearing water. This requires adding acid to the zeolite filter, attaching a pump to the tank's inlet and outlet and circulating the acid for a period of time. For optimum efficiency, a zeolite filter should be regenerated every other day. The process should require less than 24-hours to accomplish. Whereby there is approximately 12-hours or less using the stripping tower and 12-hours or less for performing rinsing and re-establishing the pH level of the zeolite.

As discussed above dissolved organics must be considered. The build up of dissolved organics are usually a problem encountered with closed systems. Prior closed systems require a foam fractionator to remove the dissolved organics. The injection of ozone as discussed with the present invention simultaneously removes nearly all the dissolved organics associated with a closed system. Also as mentioned above, disease control is an important concern for closed systems. The use of zeolite also eliminates the problems associated with using antibiotics for disease control in a biofilter based closed system. The zeolite-based systems are free to use any approved disease treatment, as the zeolite will not be harmed. Also, the use of ozone nearly eliminates the incidence of disease. With each pass of the rearing water, the ozone dosage is high enough to destroy bacteria and viruses that may be present. Therefore, if in-coming stocks are disinfected and disease-free, the rearing system of the present invention should remain safe and healthy.

Additional features of the system include spare pumps and an automatic backup electrical generator for emergency situations. In addition, the beforementioned emergency oxygen system that automatically delivers oxygen directly to the tanks is also included should a failure occur. The size of the bottled oxygen of the emergency oxygen system should be chosen to last several days at maximum loading of the closed system. To avoid error, the closed system of the present invention could be automated. Another safety option nearly always applied is the use of one or more collection boxes (not shown) as part of the system. The collection box performs the function of an external standpipe and prevents the rearing tanks 12 from being emptied if the system fails to return water to the rearing tanks 12. The system could be designed with just one collection box; a single system collection box for the mid-drain flow and a single system collection box for the bottom drain flow; or an individual collection box for each drain flow of each tank. An example of a collection box is a tank with a standpipe that aids in controlling the level of water in the rearing tanks 12. As an example, a collection box would be used between the rearing tanks 12 and the settling chamber 14 and between the rearing tanks and the gas transfer device 20. The water from the individual drains flows into each collection box through the stand pipe. If the water is from the mid-drain, it is then pumped to the gas transfer device 20. If the water is from the bottom drain, it is fed to the settling chamber 14. The collection box size and standpipe height is adjusted based on the water level to be maintained in the rearing tanks 12 at all times.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. An aquatic life rearing system comprising:
   at least one rearing tank holding water for rearing aquatic life, said rearing tank including a first drain;
   a solid removal means for removing solids from a first drain flow, said first drain flow being a flow of water from said first drain;
   an ammonia removal filter for removing ammonia from said first drain flow; and
   an ozone input into said first drain flow for receiving ozone into said first drain flow, said ozone input before said ammonia removal filter;
   wherein said first drain is a bottom drain of said rearing tank, wherein said first drain flow is a bottom drain flow; wherein said rearing tank further includes a mid-level drain for producing a mid-level drain flow; and wherein said system further includes a gas transfer means for providing oxygen to said mid-level drain flow.

2. The system of claim 1, wherein said gas transfer means includes an ozone destruction unit.

3. The system of claim 1, wherein said gas transfer means is a packed column.

4. The system of claim 1, wherein said gas transfer means is a contact chamber.

5. A method of treating water in an aquatic life rearing system comprising:
   a. providing a first flow of said water to a solid removal means for removing solids from said first flow;
   b. pumping said first flow from said solid removal means through a first ammonia removal filter for removing ammonia from said first flow;

c. inputting ozone into said first flow before said first flow enters said first ammonia removal filter;

d. destroying organic matter in said first ammonia removal filter with said ozone to prevent fouling of said ammonia removal filter; and wherein said first flow is from a bottom drain of a rearing tank, wherein said rearing tank includes a mid-level drain for producing a mid-level drain flow; and wherein said mid-level drain flow is passed through a gas transfer means for providing oxygen to said mid-level drain flow.

6. The method of claim 5, further including passing said first flow through a gas transfer means for providing oxygen to said first flow.

7. The method of claim 6, wherein said gas transfer means is a contact chamber.

8. The method of claim 5, wherein said solid removal means is a settling chamber.

9. The method of claim 5, wherein said first ammonia removal filter a includes zeolite to remove the ammonia.

10. The method of claim 5, wherein said first flow is pumped upward through said first ammonia removal filter.

11. The method of claim 5, further including a second ammonia removal filter for use as a backup filter for said first ammonia removal filter.

12. The method of claim 5, further including removing said ammonia from said first ammonia removal filter to allow said ammonia removal filter to be re-generated and remove the ammonia from the first flow.

13. The method of claim 5, further including pumping brine through said first ammonia removal filter to absorb ammonia collected from said first flow by said first ammonia removal filter.

14. The method of claim 13, further including passing said brine with said absorbed ammonia through an air stripping tower to remove said ammonia and thereby recycle said brine.

15. The method of claim 5, further including destroying any excess ozone with an ozone destruction unit.

* * * * *